United States Patent [19]

Bailey

[11] Patent Number: 4,642,212
[45] Date of Patent: Feb. 10, 1987

[54] METHOD FOR LOCATING A PRECISION ROBOTIC BASE COMPONENT

[75] Inventor: Edward J. Bailey, Cincinnati, Ohio

[73] Assignee: Cincinnati Milacron Inc., Cincinnati, Ohio

[21] Appl. No.: 720,777

[22] Filed: Apr. 8, 1985

[51] Int. Cl.[4] .............................................. B32B 31/06
[52] U.S. Cl. ...................................... 264/262; 29/458;
29/527.2; 29/527.3; 264/263; 264/264;
264/279; 269/7; 269/71
[58] Field of Search ............... 264/261, 263, 264, 275,
264/277, 279, 279.1, 16, 17, 19, 278, 242, 262;
29/458, 464, 527.2, 527.3; 269/7, 71; 51/216 R;
249/139

[56] References Cited

U.S. PATENT DOCUMENTS 2,851,728  9/1958  Spalten et al. ..................... 264/17
3,540,314  11/1970 Howard ........................... 264/242 X
4,031,838  6/1977  Schmidt et al. ................. 264/263 X Primary Examiner—Jan Silbaugh
Assistant Examiner—Leo B. Tentoni
Attorney, Agent, or Firm—Thomas M. Farrell

[57] ABSTRACT

A robotic base compartment has an interior locating surface. A plurality of pins extend squarely from the locating surface. The pins are located by pre-assembly machining and the extending pin surfaces are coated with a release agent. A robotic component plate, such as a gear-carrying plate, is assembled in the base compartment, with clearance slots surrounding the locating pins. After adjustably positioning the gear elements with one another by shifting the component plate, the slots are filled, for at least a portion, with a pourable hardenable material such as epoxy which is then allowed to harden. The components may thereafter be disassembled and reassembled without the loss of precision location. The assembly method obviates the need for manual drilling and reaming of pin holes at assembly and the attendant chip contamination that results therefrom.

2 Claims, 7 Drawing Figures

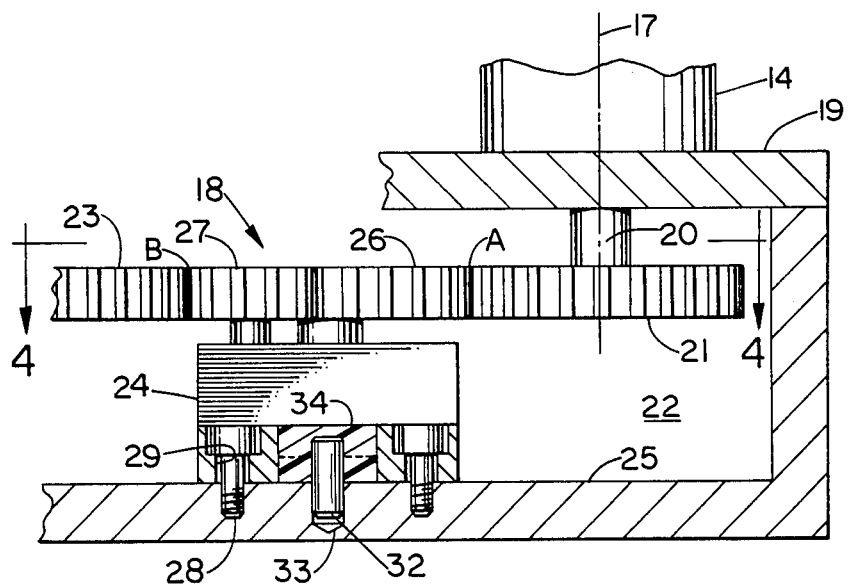
FIG. 3
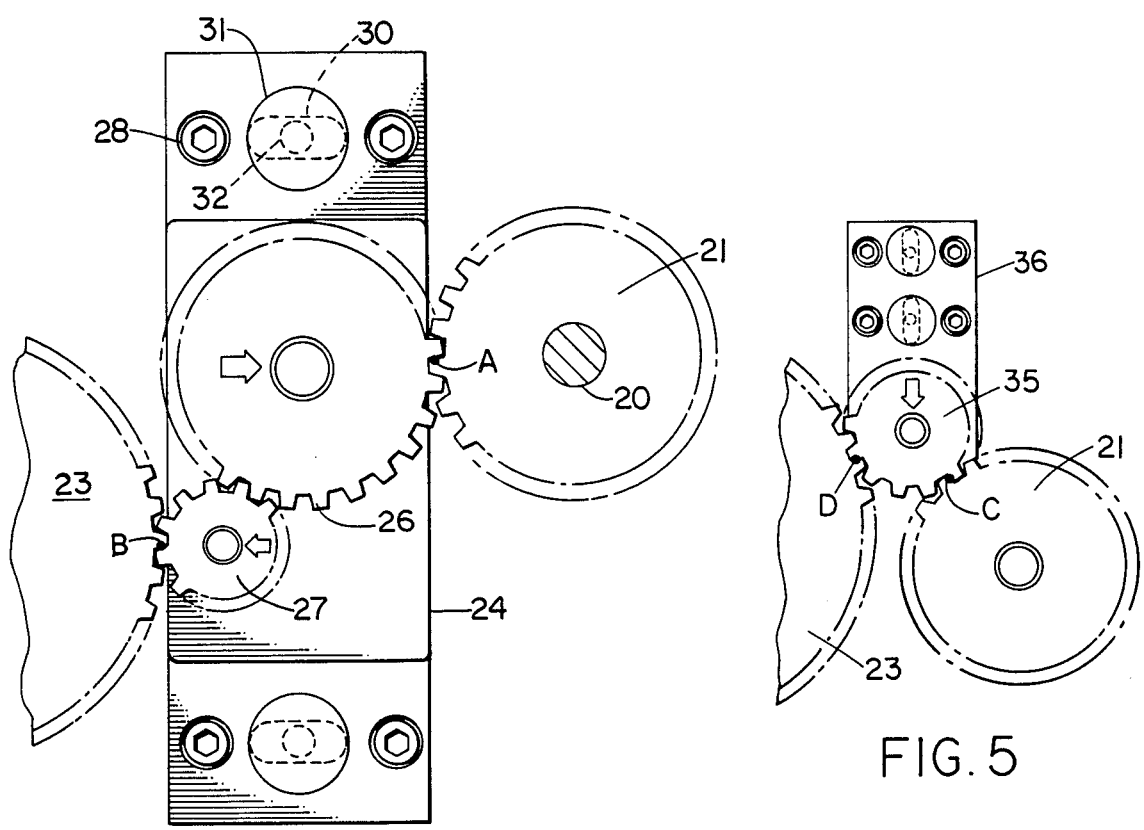
FIG. 4
FIG. 5

METHOD FOR LOCATING A PRECISION ROBOTIC BASE COMPONENT

BACKGROUND OF THE INVENTION

The invention is generally related to methods for locating precision mechanisms and, specifically, the invention relates to the location of precision robotic base components in a robotic base compartment wherein the precision of the assembly will be maintained after disassembly and reassembly steps.

It is well-known in machine arts to mount certain machine components such as gears, bearings, cams and the like on a plate which is separable from the main machine housing, to facilitate ease of machining and assembly. It is also well-known to those skilled in machine assembly practice that once certain components are aligned with one another to maintain center distances, etc., a sub-assembly plate may be pinned in position with the main machine housing by in-line-reaming a hole to size, through both members and pressing in a straight dowel pin, or tapered pin in some instances. Thereafter, upon disassembly and reassembly, the pin members may be pressed back into the same alignment holes to reestablish the precision of the assembly.

Several problems are inherent in the prior art assembly method, namely: the drilling and reaming of the pin holes causes chips and other machining swarf to be formed within the machine housing; and, since final assembly reaming is most often manually done, the pin holes may tend to have less accuracy of squareness with the mounting surface than those which can be machined by a machine tool, and non-parallel pins may make disassembly difficult.

External mounting surfaces do not present a chip contamination problem, but in the case of a precision robotic base having a compartment in which mechanism assembly must be performed, it is imperative to keep the compartment clean and free of metal dust and chips.

Applicant has obviated the difficulties inherent in the prior art devices and methods, by providing a robotic base compartment with a surface for mounting an apertured plate which carries robotic components, wherein the plate aperture may be grossly positioned over a keying member affixed to the base compartment, and the final adjustment of the assembly performed. After the adjustment of the center distances, etc., a moldable compound is poured in the clearance between the plate aperture and the keying element. Thereafter, the components may be separated and reassembled without the loss of precision and without causing the formation of metal dust and particulant contamination to foul the assembly.

It is therefore an object of the present invention to provide a method of assembly which does not require manual machining within a robotic base compartment.

Another object of the present invention is to provide a base component assembly method in a robotic base compartment, which will maintain the accuracy of the assembly for repeated disassembly and reassembly of the units.

SUMMARY OF THE INVENTION

The invention is shown embodied in a method for locating a precision robotic base component within a robotic base compartment, wherein a keying element or locating pin is established in the base compartment square to the mounting surface, and a robotic base component plate member, has a clearance opening formed therein for surrounding the keying pin. After locating the robotic base component plate in the base compartment, with the keying pin extending into the clearance aperture, the clearance space between the pin and plate is filled for at least a portion with a pourable, hardenable material such as epoxy resin, which is then allowed to harden. Prior to pouring the hardenable material, the keying pin is coated with a release agent to permit the hardenable material to be separated therefrom. By the foregoing method, the base component may be easily removed from a plurality of locating pins since squareness is maintained, and the robotic base compartment is maintained free of machining dust and particles.

BRIEF DESCRIPTION OF THE DRAWINGS

FIG. 3 is an elevational section through the robot base drive of FIG. 1.

FIG. 4 is a plan view of the base drive elements of FIG. 3.

FIG. 5 is a plan view of an alternate base drive.

DESCRIPTION OF THE PREFERRED EMBODIMENT

Figure 1:
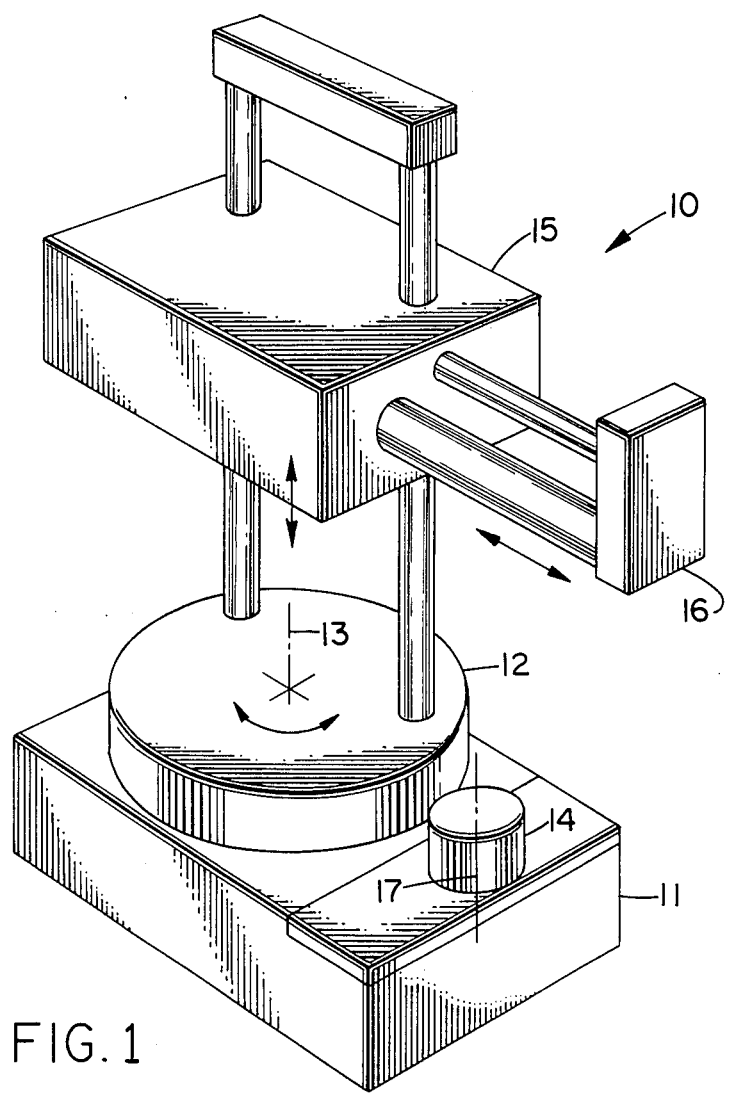
FIG. 1 is a perspective view of a coordinate robot.

Referring to the drawings, FIG. 1 depicts a coordinate industrial robot 10. The robot 10 has a stationary base 11, supporting a platform 12 which is bidirectionally rotatable through approximately 300° of rotary motion around a vertical axis 13 on the base 11 in response to a base drive motor 14. The robot platform 12, in turn, supports the coordinately movable assembly 15 used for maneuvering a work gripping device (not shown) which may be located on the end plate 16.

The base drive motor 14 depicted is mounted with a vertical axis of rotation 17.

The sectional view of FIG. 3 and the plan view of FIG. 4 illustrate an exemplary base drive 18 in which the invention may advantageously be used. The motor 14 is affixed to a base cover 19. The motor shaft 20 carries a drive gear 21 within a base drive compartment 22. A driven gear 23 is affixed to the robot platform 12 (FIG. 1). A component mounting plate 24 is located on an interior base mounting surface 25 and carries a pair of rotatable gears 26,27 in mesh at a fixed center distance. The gears 26,27 are, in turn, meshed respectively, with the drive gear 21 and the driven gear 23 at mesh points A and B.

As FIG. 4 shows, the correct engagement at points A and B is easily accomplished at final assembly by moving the plate 24 in the directions of the broad arrows. The plate 24 may end up slightly cocked, but is then secured by the four corner cap screws 28, which pass through clearance holes 29 in the plate 24.

In order to eliminate the need for drilling and reaming pin holes at assembly, the plate 24 is provided with a pair of clearance slots 30 and large diameter counterbores 31. The slots 30 surround a pair of straight pins 32 which have been received in the base 11 and extend from the mounting surface 25. Thus, the pin holes 33 in the base 11 may be machined accurately and square with the mounting surface 25 during the pre-assembly processing of the robotic base 11.

After adjusting the mesh at points A and B, the clearance slot 30 and at least a portion of the counterbore 31 are filled with a pourable, hardenable, material such as epoxy resin 34, so that the material, when hardened, will become an integral part of the component plate 24, conformed to the locating pin 32. The locating pin 32 is precoated with a release agent such as silicon so that, after epoxy hardening, the plate 24 may be removed from the base mounting surface 25 by simply sliding it off the parallel locating pins 32. Upon reassembly, the component plate 24 will accurately reestablish the gear meshes A and B in the base compartment 22.

FIG. 5 depicts a three-gear mesh where an idler gear 35 and a component plate 36 are moved transversely to the line of centers of the fixed gears 21,23 to establish a proper mesh at points C and D.

Figure 2:
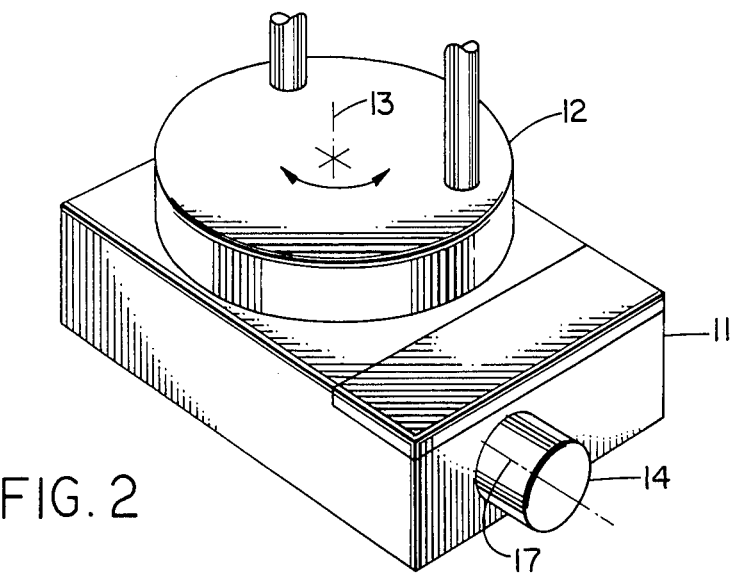
FIG. 2 is a perspective view of a coordinate robot with an alternate base drive.

Referring to FIG. 2, the base drive motor 14 is mounted at right angles to the base axis of rotation 13, i.e. with the motor axis 17 extending in a horizontal attitude.

Figure 6:
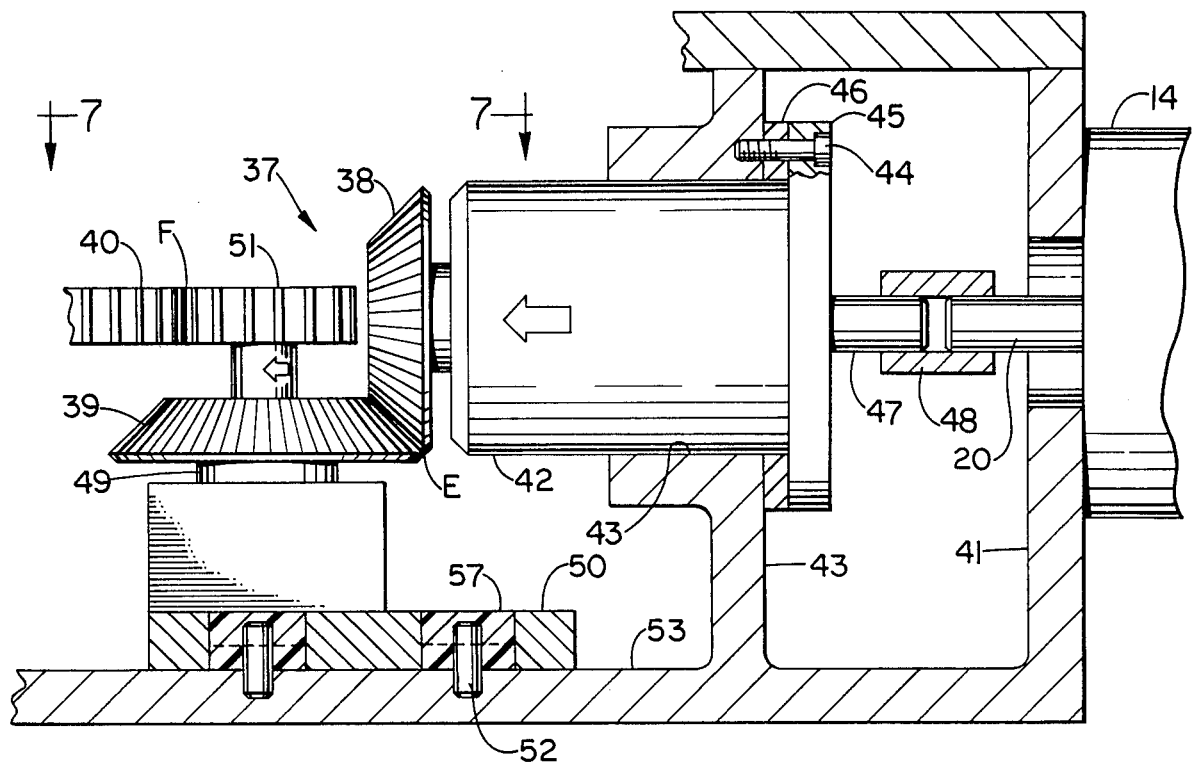
FIG. 6 is an elevational section through the base drive of FIG. 2.
Figure 7:
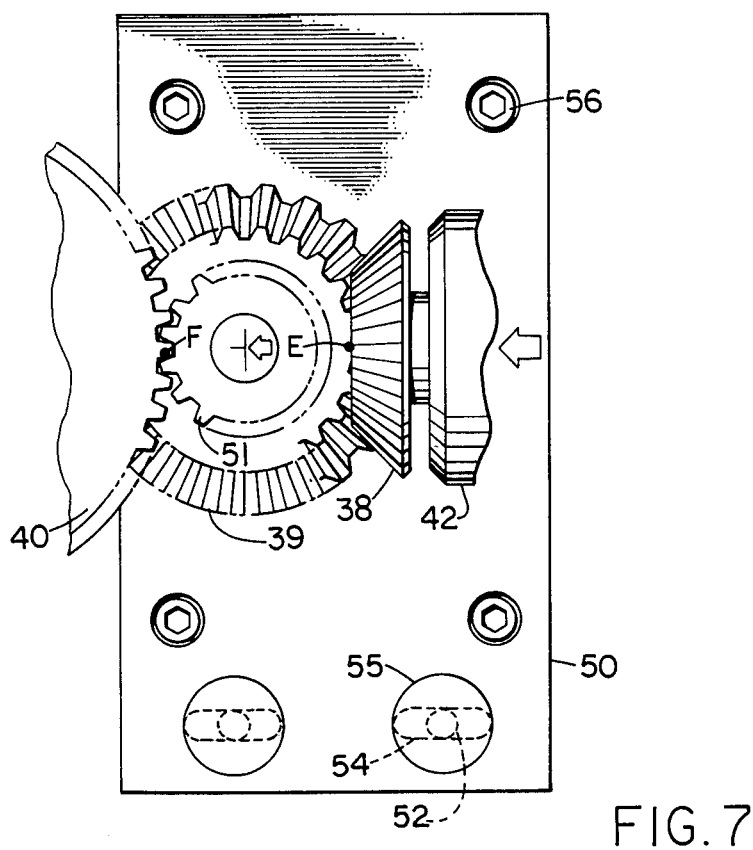
FIG. 7 is a plan view of the base drive elements of FIG. 6.

The views of FIGS. 6 and 7 show that the base drive 37 uses a set of bevel gears 38,39 to effect a 90° drive from the motor 14 to the driven platform gear 40. The motor 14 is mounted to the exterior base wall 41. A bearing cartridge 42 is supported in a bore 43 in an interior wall 43 and secured by cap screws 44 passing through a cartridge flange 45 and fitting washer 46. The bearing cartridge 42 carries a rotatable input shaft 47 which extends from the cartridge 42 and is connected to the motor shaft 20 by a coupling 48. At the other end of the shaft 47 the first bevel gear 38 is in mesh with the second bevel gear 39 at point E. The vertical shaft 49 of the second bevel gear 39 is rotatably carried in bearings (not shown) in a component plate 50. The second bevel gear shaft 49 carries a pinion 51 at the topmost end which is drivingly connected to the platform gear 40 at mesh point F.

The bevel gear mesh is achieved by axially moving the first bevel gear 38 while sliding the cartridge 42, without the fitting washer 46 in position. Upon proper mesh at point E, the space between the flange 45 and the interior wall 43 is measured, and the fitting washer 46 is ground to match. The washer 46 is then assembled with the cartridge 42 and secured with the cap screws 45.

Before fitting the bevel gears 38,39 the pinion 51 is first properly meshed at point F. However, it is necessary that the line of centers of the bevel gears 38,39 not be disturbed. Therefore, adjustment of the gears should take place in the direction of the broad arrows in FIG. 7. To insure linear movement of the component plate 50, a pair of pins 52 are located on a line of centers parallel to the first bevel gear shaft 47. The pins 52 extend squarely from the component plate mounting surface 53 into accurate close-fitting slots 54 in the plate 50. Thus, the slots 54 will slide on the pins 52 in a key-keyway relationship. The slots 54 each have a large diameter counterbore 55, and after the plate 50 is secured by a plurality of cap screws 56 and the pins 52 are coated with a release agent, the counterbore 55 and slot 54 is filled with epoxy resin 57, or other suitable material.

Thus, it can be seen that the base component plate 50 may be accurately assembled with the base 11 without creating metal dust and particulate contamination found in prior assembly methods employing manual reaming of holes during assembly.

It will be appreciated by those skilled in the art that other components may likewise be assembled by the method described. Therefore, while the invention has been shown in connection with a preferred embodiment, it is not intended that the invention be so limited, but rather the invention extends to all such designs and modifications as come within the scope of the appended claims.

What is claimed is:

1. A method for locating a precision robotic base component in a robotic base compartment, comprising the following steps:
    (a) securing a keying element in said base compartment of a relatively fixed robotic base;
    (b) forming a clearance opening for said keying element in said robotic base component;
    (c) locating said robotic base component in said base compartment with said keying element extending into said clearance opening;
    (d) providing said keying element with release means;
    (e) then filling at least a portion of said opening with a pourable, hardenable material, said material surrounding said keying element; and
    (f) then next allowing said material to harden onto said robotic base component and allowing said robotic base component to be removable from said keying element.

2. A method for locating a precision robotic base component in a robotic base compartment, comprising the following steps:
    (a) affixing a pin into base compartment surface, allowing a portion of said pin to extend from said surface;
    (b) forming a clearance opening for said pin through opposite sides of said component;
    (c) locating and securing one of said sides of said base component in said compartment against said surface with said pin extending into said clearance opening;
    (d) coating said portion of said pin with a release agent;
    (e) then filling at least a portion of said opening with a pourable, hardenable material, said material surrounding said pin; and
    (f) then next allowing said material to harden onto said robotic base component and allowing said robotic base component to be removable from said pin.

* * * * *